United States Patent
Noh et al.

(10) Patent No.: US 10,963,457 B2
(45) Date of Patent: Mar. 30, 2021

(54) SEARCH QUERY AND JOB TITLE PROXIMITY COMPUTATION VIA WORD EMBEDDING

(71) Applicant: Microsoft Technology Licensing, LLC, Redmond, WA (US)

(72) Inventors: Yongwoo Noh, Sunnyvale, CA (US); Dhruv Arya, Sunnyvale, CA (US); Ganesh Venkataraman, San Jose, CA (US); Aman Grover, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 16/382,518

(22) Filed: Apr. 12, 2019

(65) Prior Publication Data

US 2019/0236063 A1    Aug. 1, 2019

Related U.S. Application Data

(63) Continuation of application No. 15/600,444, filed on May 19, 2017, now Pat. No. 10,303,681.

(51) Int. Cl.

| | | |
|---|---|---|
| *G06F 16/242* | (2019.01) | |
| *G06Q 50/00* | (2012.01) | |
| *G06Q 10/10* | (2012.01) | |
| *G06N 20/00* | (2019.01) | |
| *G06F 16/951* | (2019.01) | |
| *G06F 16/958* | (2019.01) | |
| *G06N 3/08* | (2006.01) | |
| *G06N 7/00* | (2006.01) | |
| *G06N 3/04* | (2006.01) | |

(52) U.S. Cl.
CPC .......... *G06F 16/242* (2019.01); *G06F 16/951* (2019.01); *G06F 16/958* (2019.01); *G06N 3/08* (2013.01); *G06N 20/00* (2019.01); *G06Q 10/1053* (2013.01); *G06Q 50/01* (2013.01); *G06N 3/0454* (2013.01); *G06N 7/005* (2013.01)

(58) Field of Classification Search
CPC ..... G06F 16/248; G06F 16/316; G06F 16/242
See application file for complete search history.

(56) References Cited

U.S. PATENT DOCUMENTS

| | | | |
|---|---|---|---|
| 2014/0214808 A1* | 7/2014 | Satoh | G06F 16/316 707/722 |
| 2018/0173802 A1* | 6/2018 | Grover | G06F 16/248 |
| 2018/0173803 A1* | 6/2018 | Grover | G06F 16/248 |

* cited by examiner

*Primary Examiner* — Etienne P Leroux
(74) *Attorney, Agent, or Firm* — Schwegman Lundberg & Woessner, P.A.

(57) ABSTRACT

Various embodiments described herein provide for systems and methods for using a machine-learning model to rank job search results based on the similarity of the job title of each job search result and a job search query that produces the job search results. According to some embodiments, the machine-learning model comprises a word-embedding machine-learning model that maps a word to a vector.

17 Claims, 11 Drawing Sheets

US 10,963,457 B2

SEARCH QUERY AND JOB TITLE PROXIMITY COMPUTATION VIA WORD EMBEDDING

CROSS-REFERENCE TO RELATED APPLICATION

This application is a Continuation of U.S. patent application Ser. No. 15/600,444, filed on May 19, 2017, the contents of which are hereby incorporated by reference in their entirety.

TECHNICAL FIELD

The present disclosure relates to methods, systems, and programs for finding job offerings for a member of a social network based on a search query.

BACKGROUND

Various social networks provide job postings to their members. The member may perform a job search by entering a job search query, or the social network may suggest jobs that may be of interest to the member. However, current job search methods may miss valuable opportunities for a member because job search engines generally use raw string matching that matches the same words in a job search query and a job title, or use standardized entity matching that fetches a standardized title in the job search query and matches it against one associated with a job. Job search engines are usually unable to comprehend similarities between a job search query and a job title when different words are used. For instance, "Application Developer" and "Software Engineer" are very similar job titles but they use very different words.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
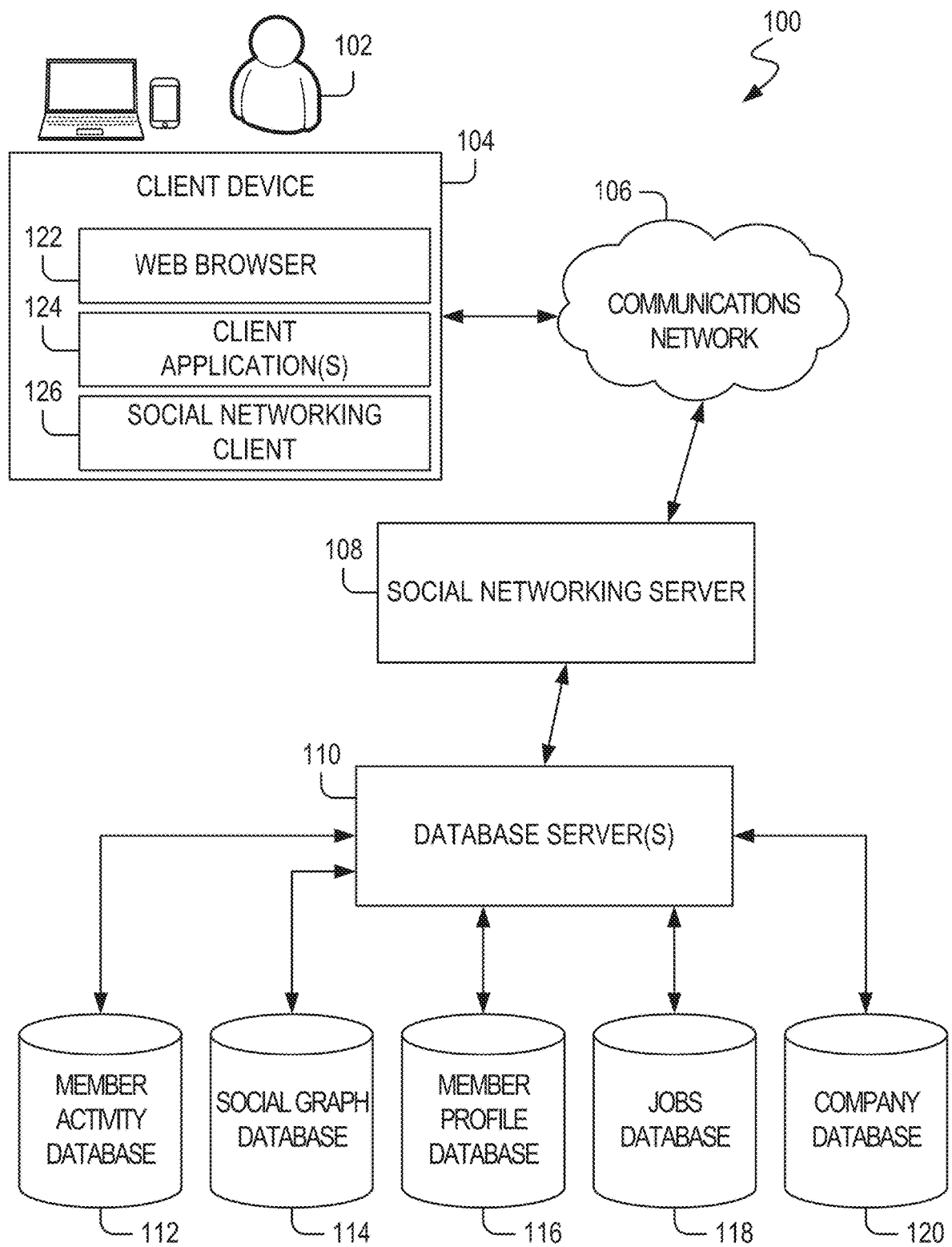
FIG. 1 is a block diagram illustrating an example networked system including a social networking server that can implement job search query and job title proximity computation, in accordance with some embodiments.

As noted herein, traditional job search engines are usually unable to comprehend similarities between a job search query and a job title when different words are used. For instance, when a user enters a job search query of "software engineer," they expect job posting search results (hereafter, job search results) having job titles including "software engineer," but may also expect job titles including "application developer" or "java engineer," as these are specific examples of job titles for a software engineer. An exact word matching feature of a traditional job search engine may not include or rank job search results having the latter job titles, as they include no or very few words that exactly match the job search query.

Various embodiments described herein provide for using a machine-learning model to rank job search results based on the similarity of the job title of each job search result and a job search query that produces the job search results. According to some embodiments, the machine-learning model comprises a word-embedding machine-learning model that maps a word to a vector. An example word-embedding machine-learning model can include, without limitation, Word2Vec, which is a two-layer neural-network model that can use the contexts of words to compute the word embedding of a particular word.

For some embodiments, determining the similarity between a given job title and a given job search query may comprise: generating a vector for the given job title using a word-embedding machine-learning model (e.g., by mapping words of the job title to vectors and combining those vectors); generating a vector of the given job search query based on the word-embedding machine-learning model (e.g., by mapping words of the job search query to vectors and combining those vectors); and computing a similarity (e.g., cosine similarity) between the two generated vectors. In this way, the generated vectors may be used to determine how similar in meaning the given job search query is to the given job title. Various embodiments described herein operate under the assumption that, through a word-embedding machine-learning model, words with similar meanings map to vectors that are near each other (e.g., similar words are clustered in close proximity). For some embodiments, a vector comprises a real number. Alternatively, a vector can comprise another type of numerical value.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Implementing various embodiments described herein may involve one or more of: training a word-embedding machine-learning model (word-embedding training); training a job search model (job search model training); and utilizing a search ranking feature that uses a trained word-embedding machine-learning model to determine similarities between job search queries and the job titles of job search results.

To train a word-embedding machine-learning model, some embodiments use as training input job search queries that were previously submitted by users to a search engine (e.g., and stored in a search history database), and use job titles of job postings in a jobs database. For instance, the input job titles may be extracted from job postings currently in the database and normalized using analyzers. The input job search queries may be extracted from search tracking events that were generated by prior-submitted searches. Prior to the training of the word-embedding machine-learning model, the job titles and job search queries may be normalized (e.g., using analyzers) for training purposes.

Based on job application data that indicates a user-confirmed association between a given prior-submitted job search query and a given job search result (e.g., a user applied to a job posting provided by way of the given job search result), some embodiments train the word-embedding machine-learning model based on pairing the text string of the given prior-submitted job search query (e.g., "software engineer") with the text string of the job title (e.g., "application developer") of the given job search result. The pairing may comprise, for example, a concatenation of the two text strings (e.g., "software engineer application developer"), which the word-embedding machine-learning model may then be trained on. For some embodiments, the word-embedding machine-learning model trains on a corpus comprising a plurality of pairings of prior-submitted job search queries and job titles of associated job search results. Once trained, the word-embedding machine-learning model can map a word from a job title or a job search query (e.g., from a new job search result or job search query) in the same dimension.

Various embodiments train the word-embedding machine-learning model based on pairing prior-submitted job search queries with associated job application data based on the assumption that such pairings indicate strong user-confirmed correlations between job search queries and job titles. In other words, the user executing a job search query and then applying to one of the job search results is a good sign that the job search query is similar, or at least strongly related, to that search result and its specified job title.

For instance, where a user executes a job search query and then applies for a job posting represented by one of the job search results, there is a high likelihood that the job title associated with the job posting is similar (or at least relates) to the job search query even when the job search query comprises different words than the job type.

A job search model may be trained by way of providing the job search model access to a word-to-vector dictionary that may be extracted from the trained word-embedding machine-learning model. The job search model may then use this dictionary to map words to vectors for search ranking scores according to an embodiment. In a distributed computing environment (e.g., based on Hadoop®), this dictionary may be made available as distributed a cache (e.g., to various Hadoop® jobs handling job searches). To optimize vector operation during similarity computation and to minimize performance degradation of the job search model, various embodiments load the word-to-vector dictionary by using offheap (e.g., galene offheap). Doing so pet mits such embodiments to avoid using heap memory to load and avoid garbage collection on the map object.

With regard to a search ranking feature that uses a trained word-embedding machine-learning model to determine similarities between job search queries and the job titles of job search results, as noted herein, when determining a similarity between a given job search query and the job title of a given job search result, a vector is generated for the given job search query and another vector is generated for the job title of the given job search result. The vector for the given job search query may be generated by using the word-embedding machine-learning model to determine the vector of each word in the given job search query, and then combining the determined vectors together (e.g., averaging the vectors). Similarly, the vector for the job title of the given job search result may be generated by using the word-embedding machine-learning model to determine the vector of each word in the job title, and then combining the determined vectors together (e.g., averaging the vectors). Subsequently, the similarity (e.g., similarity coefficient) of the given job search query and the job title of the given job search result may be determined based on the combined vector of the given job search query and the combined vector of the job title (e.g., by calculating the cosine similarity of the two combined vectors). For some embodiments, the level of similarity is represented by a similarity coefficient comprising a numerical value (e.g., a real number). For some embodiments, the more similar the two combined vectors are to each other (e.g., the nearer they are to each other in value), the more similar in meaning the given job search query and the job title are. Additionally, for some embodiments, the higher the similarity between the given job search query and the job title of the given job search result, the higher the search ranking score associated with the given job search result.

For some embodiments, the vector for the given job search query is determined based on normalized versions of words from the given job search query. Additionally, for some embodiments, the vector for the given job search query is determined based a raw version of the given job search query, which only includes keywords.

As noted herein, the word-embedding machine-learning model used by various embodiments may comprise Word2Vec, which generally takes as input a large corpus of text and produces a high-dimensional vector space (e.g., between a hundred and several hundred dimensions). With Word2Vec, some embodiments use a word-embedding machine-learning model (once trained) to map each unique word in the corpus (e.g., comprising pairings of job search queries and user-associated job titles) to a corresponding vector in the vector space. The resulting vectors are positioned in the vector space such that unique words that share common contexts in the corpus (e.g., comprising pairings of job search queries and user-associated job titles) are located in close proximity to one another in the vector space. Accordingly, the word-embedding machine-learning model can be used by various embodiments to identify similarities between job search queries and job titles, particularly when the two use different words (e.g., a job search query of "employment attorney" and a job title of "human resources lawyer"). Though various embodiments are described herein with reference to using Word2Vec for word embedding, some embodiments may use other word-embedding tools, such as Gensim, Latent Dirichlet Allocation (LDA), and Tensor flow, each of which is a shallow, two-layer neural-network model that can be trained to reconstruct linguistic contexts of words for use with various embodiments.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example networked system 100 including a social networking server 108 that can implement job search query and job title proximity computation, in accordance with some embodiments. As shown, the networked system 100 comprises an embodiment of a high-level client-server-based network architecture. The social networking server 108 provides server-side functionality via a communications network 106 (e.g., the Internet or a wide area network (WAN)) to one or more client devices 104. FIG. 1 illustrates, for example, a web browser 122 (e.g., the Internet Explorer® browser developed by Microsoft® Corporation), client application(s) 124, and a social networking client 126 executing on a client device 104. The social networking server 108 is further communicatively coupled with one or more database servers 110 that provide access to one or more databases 112-120.

The client device 104 may comprise, but is not limited to, a mobile phone, a desktop computer, a laptop, a portable digital assistant (PDA), a smart phone, a tablet, an ultrabook, a netbook, a multi-processor system, a microprocessor-based or programmable consumer electronic system, or any other communication device that a user 102 may use to access the social networking server 108. In some embodiments, the client device 104 comprises a display module (not shown) to display information (e.g., in the form of user interfaces). In further embodiments, the client device 104 comprises one or more of touch screens, accelerometers, gyroscopes, cameras, microphones, global positioning system (GPS) devices, and so forth.

In one embodiment, the social networking server 108 is a network-based appliance that responds to initialization requests or search queries from the client device 104. One or more users 102 may be a person, a machine, or other means of interacting with the client device 104. In various embodiments, the user 102 is not part of the network architecture, but interacts with the network architecture of the networked system 100 via the client device 104 or another means. For example, one or more portions of the communications network 106 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, the web browser 122, the social networking client 126, and the other client applications 124, such as a messaging application, an electronic mail (email) application, a news application, and the like. In some embodiments, if the social networking client 126 is present in the client device 104, then the social networking client 126 is configured to locally provide the user interface for the application and to communicate with the social networking server 108, on an as-needed basis, for data and/or processing capabilities not locally available (e.g., to access a member profile, to authenticate a user 102, to identify or locate other connected members, etc.). Conversely, if the social networking client 126 is not included in the client device 104, the client device 104 may use the web browser 122 to access the social networking server 108.

Further, while the networked system 100 is described with reference to a client-server-based network architecture, various embodiments are not limited to such an architecture, and could alternatively comprise a distributed or peer-to-peer architecture system, for example.

In addition to the client device 104, the social networking server 108 communicates with the one or more database server(s) 110 and database(s) 112-120. In one embodiment, the social networking server 108 is communicatively coupled to a member activity database 112, a social graph database 114, a member profile database 116, a jobs database 118, and a company database 120. The databases 112-120 may be implemented as one or more types of database including, but not limited to, a hierarchical database, a relational database, an object-oriented database, one or more flat files, or combinations thereof.

The member profile database 116 stores member profile information about members who have registered with the social networking server 108. With regard to the member profile database 116, the member may include an individual person or an organization, such as a company, a corporation, a nonprofit organization, an educational institution, or other such organizations.

Consistent with some embodiments, when a user initially registers to become a member of the social networking service provided by the social networking server 108, the user may be prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry (also referred to herein simply as industry), skills, professional organizations, and so on. This information may be stored, for example, in the member profile database 116. Similarly, when a representative of an organization initially registers the organization with the social networking service provided by the social networking server 108, the representative may be prompted to provide certain information about the organization, such as the company industry. This information may be stored, for example, in the member profile database 116. In some embodiments, the profile data is processed (e.g., in the background or offline) to generate various derived profile data. For instance, if a member has provided information about various job titles that the member has held with the same company or different companies, and for how long, this information may be used to infer or derive a member profile attribute indicating the member's overall seniority level, or seniority level within a particular company. In some embodiments, importing or otherwise accessing data from one or more externally hosted data sources enhances profile data for both members and organizations. For instance, with companies in particular, financial data may be imported from one or more external data sources, and made part of a company's profile.

In some embodiments, a company database 120 stores information regarding companies in the member's profile. A company may also be a member, but some companies may not be members of the social network, although some of the employees of the company may be members of the social network. The company database 120 may include company information, such as name, industry, contact information, website, address, location, geographic scope, and the like.

As users interact with the social networking service provided by the social networking server 108, the social networking server 108 may monitor these interactions. Examples of interactions include, but are not limited to, commenting on posts entered by other members, viewing member profiles, editing or viewing a member's own profile, sharing content from outside of the social networking service (e.g., an article provided by an entity other than the social networking server 108), updating a current status, posting content for other members to view and comment on, posting job suggestions for the members, posting job-post searches (e.g., historical job search data resulting from execution of job search queries), and other such interactions. In one embodiment, records of these interactions are stored in the member activity database 112, which associates interactions made by a member with his or her member profile stored in the member profile database 116. In one embodiment, the member activity database 112 includes the posts created by the users of the social networking service for presentation on user feeds.

The jobs database 118 includes job postings offered by companies in the company database 120. Each job posting can include job-related information such as any combination of employer, job title, job description, requirements for the job, salary and benefits, geographic location, one or more job skills required, day the job was posted, relocation benefits, and the like.

In one embodiment, the social networking server 108 communicates with the various databases 112-120 through the one or more database server(s) 110. In this regard, the database server(s) 110 provide one or more interfaces and/or services for providing content to, modifying content in, removing content from, or otherwise interacting with the databases 112-120. For example, such interfaces or services may include one or more Application Programming Interfaces (APIs), one or more services provided via a Service-Oriented Architecture (SOA), one or more services provided via a Representational State Transfer (REST)-Oriented Architecture (ROA), or some combination thereof. In an alternative embodiment, the social networking server 108 communicates directly with the databases 112-120 and includes a database client, engine, or module, for providing data to, modifying data stored within, or retrieving data from the one or more databases 112-120.

While the database server(s) 110 are illustrated as a single block, the database server(s) 110 may include one or more such servers. For instance, the database server(s) 110 may include, but are not limited to, a Microsoft® Exchange Server, a Microsoft® Sharepoint® Server, a Lightweight Directory Access Protocol (LDAP) server, a MySQL database server, or any other server configured to provide access to one or more of the databases 112-120, or some combination thereof. Accordingly, for some embodiments, the database server(s) 110 implemented by the social networking service are further configured to communicate with the social networking server 108.

Figure 2:
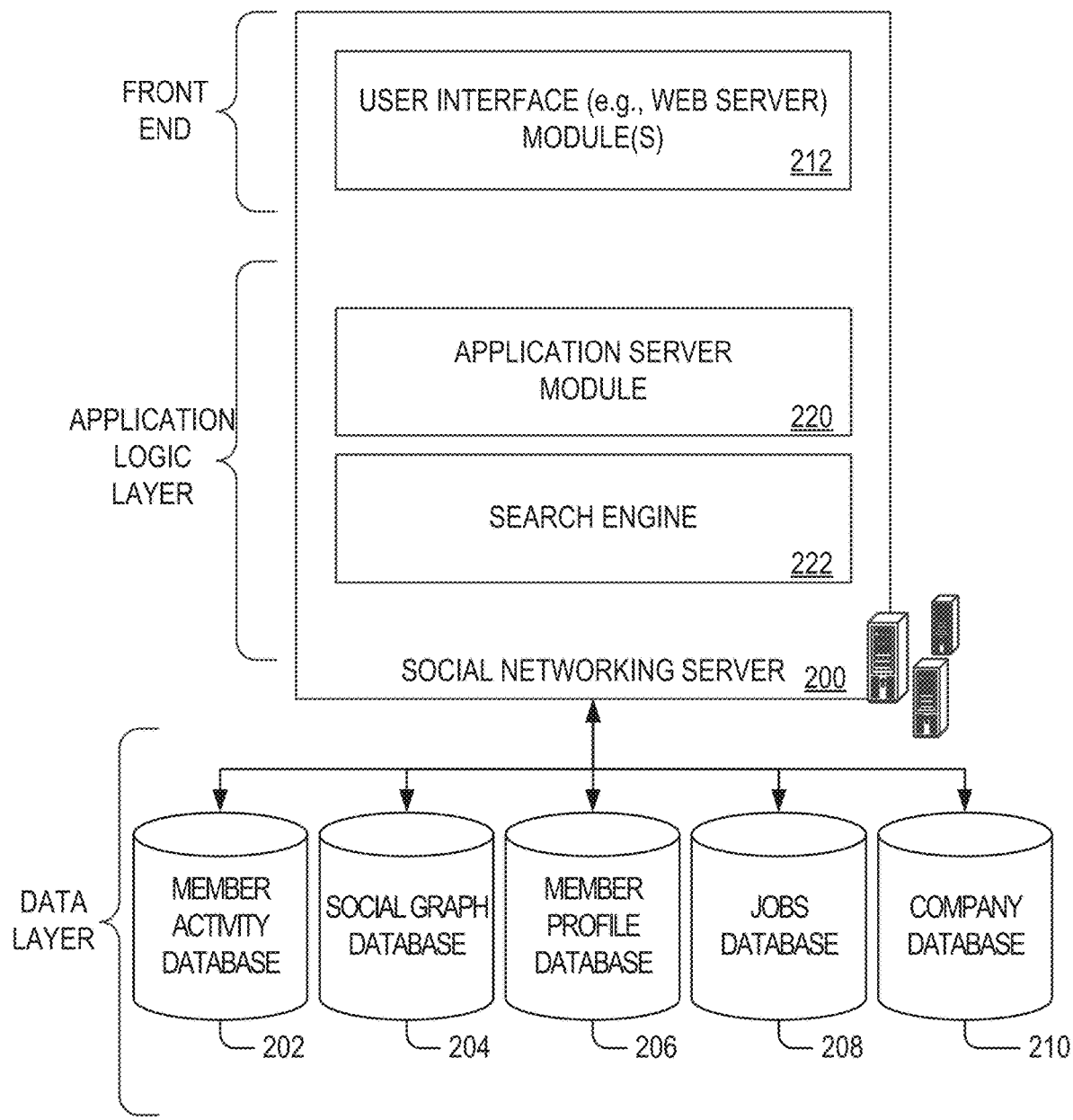
FIG. 2 is a block diagram illustrating functional components of a social networking server including a search engine that can implement or use job search query and job title proximity computation, in accordance with some embodiments.

FIG. 2 is a block diagram illustrating functional components of a social networking server 200 including a search engine 222 that can implement (or otherwise use) job search query and job title proximity computation, in accordance with some embodiments. For some embodiments, the social network server 108 of FIG. 1 comprises social networking server 200. As shown, the social networking server 200 is communicatively coupled (e.g., via a communication network) to a data layer comprising various data sources, including a member activity database 202, a social graph database 204, a member profile database 206, a jobs database 208, and a company database 210. For some embodiments, the databases 202-210 are respectively similar to the databases 112-120 of FIG. 1. The social networking server 200 includes one or more user interface modules(s) 212 (e.g., web interfaces), which can serve as the front end of the social networking services provided by the social networking server 200. The social networking server 200 includes an application logic layer comprising an application server module 220 and the search engine 222.

The user interface module(s) 212 can receive requests from various client-computing devices, and communicate appropriate responses to the requesting client devices. For instance, the user interface module(s) 212 may receive requests in the form of Hypertext Transfer Protocol (HTTP) requests, or other web-based API requests.

Various application server modules 220, in conjunction with the user interface module(s) 212, can generate various user interfaces (e.g., web pages) with data retrieved from various data sources in the data layer. In some embodiments, individual application server modules 220 are used to implement the functionality associated with various social networking applications or services supported by the social networking server 200.

The search engine 222 may be implemented as a service that operates in conjunction with various application server modules 220. For instance, any number of individual application server modules 220 can invoke the functionality of the search engine 222. However, with various alternative embodiments, the search engine 222 may be implemented as its own application server module such that it operates as a standalone application. In some embodiments, the search engine 222 includes or has an associated publicly available API that enables third-party applications to invoke the functionality of the search engine 222.

The search engine 222 may be a people-search engine, and provide functionality to search for people (e.g., member profiles) specifically. Alternatively, the search engine 222 may facilitate searching for any type of entity (e.g., people or member profiles, companies, schools and other educational institutions, etc.), or may facilitate searching for job listings/postings (hereafter, job postings). With such an embodiment, the user performing the search may specify the type of information to be searched for. Alternatively, the search engine 222 may algorithmically identify the type of search being performed, for example, based on the search query.

For some embodiments, the search engine 222 searches for job postings by initially matching a user-provided job search query with the job title of job postings. This matching may comprise exact or fuzzy word matching. For instance, the search engine 222 may perform raw string matching that matches the same words in the job search query and the job title, or use standardized entity matching that fetches a standardized title in the job search query and matches it against one associated with a job.

Various embodiments described herein can cause the search engine 222 to identify job postings having job titles that are similar to the job search query but that use different words, and to rank the job postings accordingly. For instance, the job title "software engineer" is different from the job title "application developer," but both titles are closely related because a majority of software engineers are also application developers, and vice versa. This type of title similarity may be captured by various embodiments described herein, so that many job posting search results (job search results) that could be of interest to the user are ranked appropriately and not missed by the user.

Accordingly, the search engine 222 uses a ranking algorithm that boosts or increases ranking scores assigned to job posting search results satisfying a job search query based on a set of criteria that includes the similarity between the job titles of the job postings and the job search query as determined (e.g., calculated) by various embodiments described herein (e.g., by generating and combining vectors of job titles and job search queries). For instance, the ranking algorithm may increase (e.g., by upward adjustment or calculation) the ranking scores assigned to those job posting search results satisfying the job search query and having job titles with a high similarity coefficient with the job search query. Accordingly, with all else equal, if two job search results for two different job postings differ in job titles, the job search result having a job title with a higher similarity coefficient with the job search query will be assigned the higher ranking score. By determining the similarity (e.g., similarity coefficient) between a job search query and job titles of job search results, the ranking algorithm may boost ranking scores assigned to certain of the job search results based on a determination that words specified in the job search query correspond to words in the job search results having a relationship that is relevant to a context of the job search query.

For some embodiments, the higher the ranking score assigned to a given job search result, the more prominently the given job search result is presented in a list of job search results. Additionally, ranking scores associated with job search results may be used (e.g., by the user or the social networking server 200) to filter job search results presented to the user (e.g., based on a threshold ranking score). The search engine 222 may increase or assign ranking scores based on additional criteria, such as whether an employer listed in the job search query matches the employer associated with the job search result, or whether the member profile of the user performing the job search matches the employer associated with the job search result. Each criterion (considered for ranking scores) may represent an output from a different job search rank feature, and the combination of several job search rank features may determine the ultimate ranking score of a particular job search result.

Figure 3:
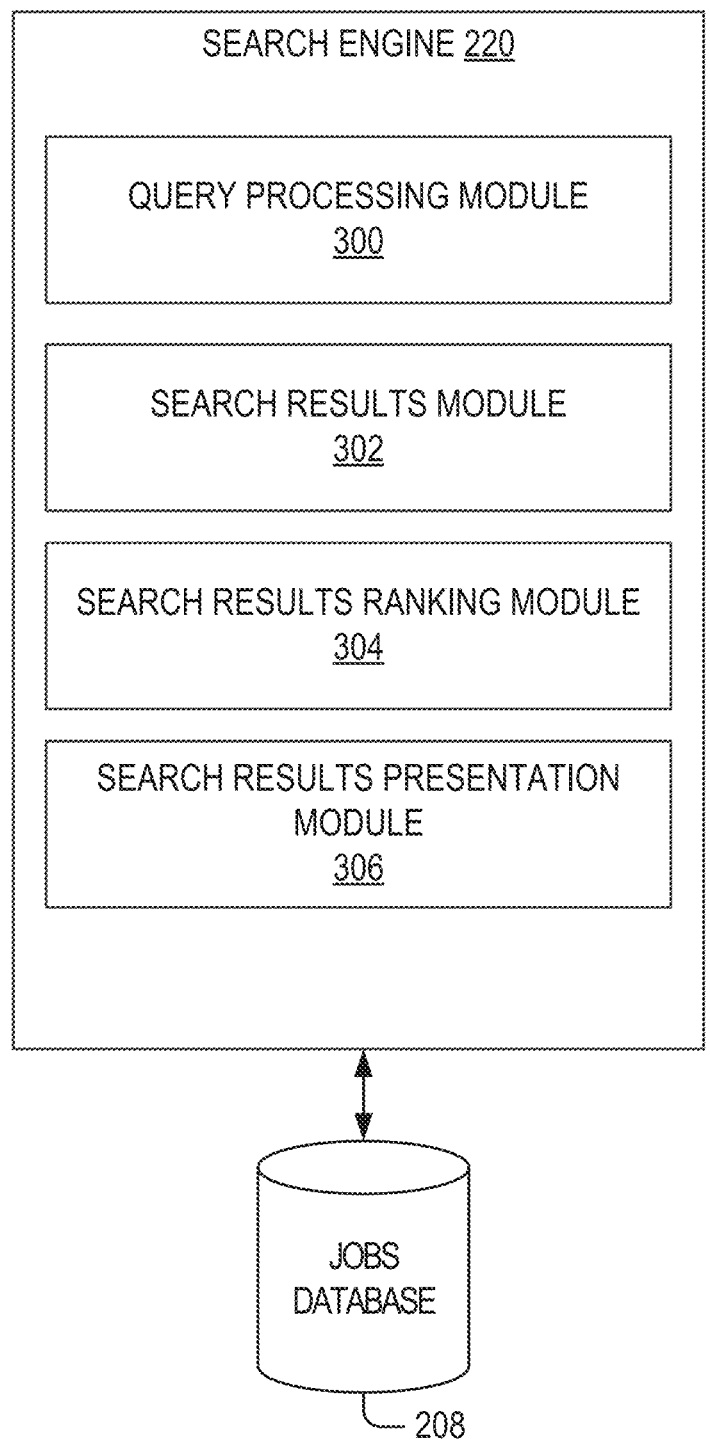
FIG. 3 is a block diagram of an example search engine, according to some embodiments.

FIG. 3 is a block diagram of the search engine 222 of FIG. 2, according to some embodiments. As illustrated in FIG. 3, the search engine 222 includes a query processing module 300, a search results module 302, a search results ranking module 304, and a search results presentation module 306. In general, the query processing module 300 receives a job search query and then processes the job search query by selecting or otherwise identifying data in a database (e.g., in the jobs database 208) that satisfies the job search query. Depending upon the nature of the job search query, one of several matching rules may be evaluated to identify the job postings that match the job search query. For example, if the job search query comprises an employer, an industry, a job type (e.g., part-time or full-time), a job function, a job skill, a seniority level, or a location, the job search query is processed by selecting the job postings from the jobs database 208 having words in one or more job posting fields (e.g., job title) that match, exactly or partially, one or more words in the job search query.

The search results module 302 collects a set of job search results identified by the query processing module 300 satisfying the job search query. For each job search query that is processed by the search engine 222, the search results module 302 may cause the identified job search results to be stored, possibly with any user selections (e.g., job application selection), in a database (e.g., a search history database or the jobs database 208).

The search results ranking module 304 derives for each job search result a ranking score representing a measure of relevance, particularly in view of the job search query and a set of other criteria (or input signals) that includes the similarity between the job title of each job search result and the job search query as determined (e.g., calculated) by various embodiments described herein. For some embodiments, the ranking algorithm uses any number of input signals for use in deriving a ranking score, where one or more signals are combined in some way (e.g., weighted, multiplied, or added together) to derive an overall ranking score. According to some embodiments, at least one of those input signals or component scores represents the extent to which a job title of a particular job search result (that represents a job posting) is similar to the job search query using word-embedding as described herein. For various embodiments, the search results ranking module 304 may have multiple ranking algorithms for use in generating ranking scores. Accordingly, a particular ranking algorithm may be selected and used depending upon the type of job search query that has been received. In general, a ranking algorithm used by the search results ranking module 304 may include any number of weighting factors, which may vary depending upon the job search query.

The search results presentation module 306 causes the search results to be presented, arranged in order of their assigned ranking scores, in a user interface. For instance, the user interface may be a search results page providing a simple list of at least a portion (e.g., based on the size of a client device's display) of the job search results that satisfied the job search query. Alternatively, in some instances, the user interface may operate in conjunction with the query processing module 300, the search results module 302, and the search results ranking module 304 to implement an incremental search technique whereby job search results are presented while a member is typing in the job search query. Such job search results may be presented, for example, in a drop-down suggestion list, or directly in a portion of a job search results web page.

Figure 4:
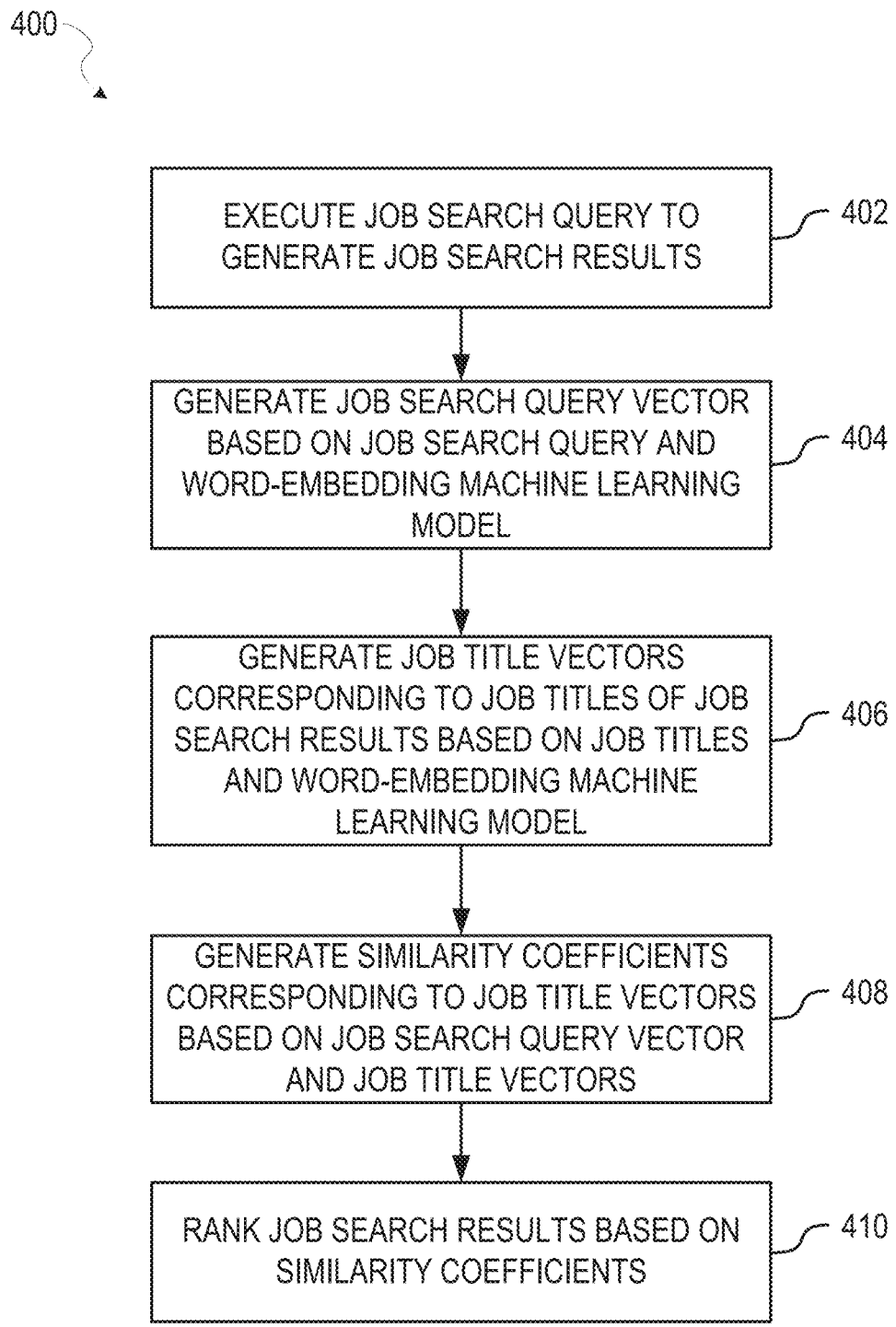
FIG. 4 is a flowchart illustrating an example method for ranking job search results, according to some embodiments.

FIG. 4 is a flowchart illustrating an example method 400 for ranking job search results, according to some embodiments. For some embodiments, the method 400 is performed, at least in part, by the social networking server 108 (having a hardware processor) described with respect to FIG. 1. An operation of the method 400 may be performed by a hardware processor (e.g., central processing unit or graphics processing unit) of a computing device (e.g., desktop, server, etc.).

The method 400 begins with operation 402 executing a job search query to generate a set of job search results, each of which may represent an individual job posting. Executing the job search query may comprise exact or partial string matching of the job search query to job titles associated with job postings. For some embodiments, the job search query is normalized prior to the job search query being executed. For instance, the job search query may be reduced to include only keywords prior to execution of the job search query.

The method 400 continues with operation 404 generating a job search query vector based on a word-embedding machine-learning model and the job search query, which was executed by operation 402. As described herein, for various embodiments, the word-embedding machine-learning model comprises Word2Vec or some other neural-network model that can use the contexts of words to compute the word embedding of a particular word (e.g., compute a vector of a particular word). For some embodiments, operation 404 comprises mapping the job search query to the job search query vector based on the word-embedding neural machine-learning model. Further, mapping the job search query to the job search query vector based on the word-embedding machine-learning model may involve mapping each word in the job search query to a word vector based on the word-embedding machine-learning model to generate a set of word vectors. The resulting set of word vectors may then be combined by some methodology to generate the job search query vector. For instance, the set of word vectors may be combined by calculating an average of the set of word vectors.

As noted herein, the word-embedding machine-learning model may comprise a neural-network model trained with respect to linguistic contexts of words, such as Word2Vec. For some embodiments, the word-embedding machine-learning model is used subsequent to being trained on job search query-job title pairings as described herein. A dictionary may be generated (e.g., derived) from the trained word-embedding machine-learning model and used by some embodiments to facilitate mapping of words to vectors.

The method 400 continues with operation 406 generating a set of job title vectors, corresponding to a set of job titles from the set of job search results, based on the word-embedding machine-learning model and the set of job titles. By corresponding to the set of job titles, the resulting set of job title vectors also corresponds to the set of job search results. For instance, each job title vector is generated based on the raw or normalized text string of its corresponding job title. For some embodiments, operation 406 comprises mapping a particular job title of each particular job search result, in the set of job search results, to a particular job title vector based on the word-embedding machine-learning model. Additionally, mapping the particular job title of each particular job search result based on the word-embedding machine-learning model may involve mapping each word in the particular job title to a word vector based on the word-embedding machine-learning model to generate a set of word vectors for the particular job title. The resulting set of word vectors may then be combined by some methodology to generate the job title vector for the particular job title. As noted herein, combining the set of word vectors may comprise averaging the set of word vectors.

The method 400 continues with operation 408 generating a set of similarity coefficients, corresponding to the set of job title vectors, based on the job search query vector and the set of job title vectors. For some embodiments, the similarity coefficient comprises a real numerical value. By corresponding to the set of job title vectors, the resulting set of similarity coefficients also corresponds to the set of job search results (by way of correspondence of the set of job title vectors to the set of job titles). According to some embodiments, generating the set of similarity coefficients comprises determining a similarity coefficient between the job search query and a particular job title of each particular job search result, in the set of job search results, based on the job search query vector and a specific job title vector, in the set of job title vectors, that corresponds to the particular job title of the particular job search result. In this way, the set of similarity coefficients, corresponding to the set of job title vectors, is produced. Determining the similarity coefficient may, for instance, comprise calculating a cosine similarity between the job search query vector and the specific job title vector.

Eventually, the method 400 continues with operation 408 ranking the set of job search results based on the set of similarity coefficients. In particular, some embodiments rank the set of job search results by assigning a higher ranking score to or, alternatively, increasing the ranking score of, a given job search result when its corresponding similarity coefficient (in the set of similarity coefficients) indicates a high level of similarity between the job search query executed at operation 402 and the job title of the given job search result. For some embodiments, the larger the numerical value of a given similarity coefficient, the higher the indication of similarity.

Figure 5:
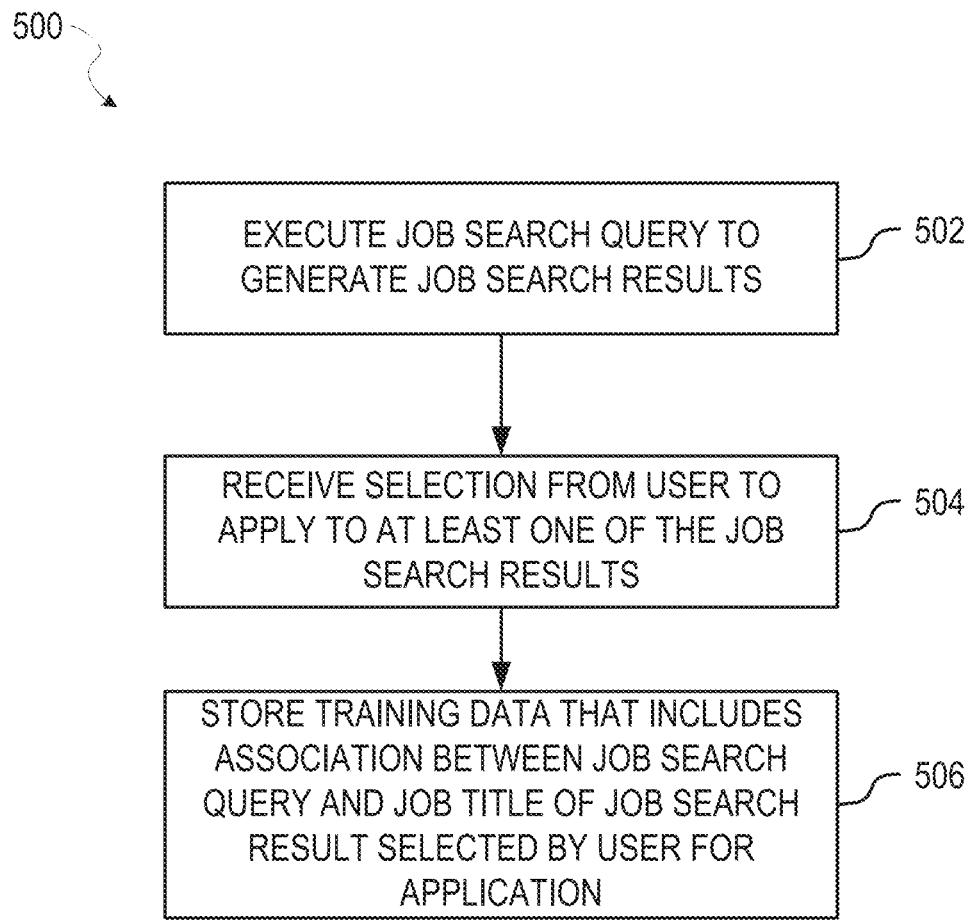
FIG. 5 is a flowchart illustrating an example method for collecting machine-learning training data, according to some embodiments.

FIG. 5 is a flowchart illustrating an example method 500 for collecting machine-learning training data, according to some embodiments. For some embodiments, the method 500 is performed, at least in part, by the social networking server 108 (having a hardware processor) described with respect to FIG. 1. An operation of the method 500 may be performed by a hardware processor (e.g., central processing unit or graphics processing unit) of a computing device (e.g., desktop, server, etc.).

The method 500 begins with operation 502 executing a job search query, from a social networking user, to generate a set of job search results. The method 500 continues with operation 504 receiving a selection from the social networking user to apply to a job search result in the set of job search results. The method 500 continues with operation 506, in response to receiving the selection, storing, by the social networking server, training data that includes an association between the job search query and a job title from the job search result. For some embodiments, the selection to apply to the job search result represents job application data.

With respect to embodiments that use Word2Vec for the word-embedding machine-learning model, the Gensim library may be used in training the word-embedding machine-learning model. Depending on the embodiment, one or more of the parameters shown in the following table may be used when training the word-embedding machine-learning model implemented using Word2Vec or the like. Similar parameter values may be used for word-embedding machine-learning models that use other machine-learning implementations.

| | |
|---|---|
| Vector size (cardinality of vector) | 200 |
| Window size (window size of context) | 5 |
| Min count (threshold of word occurrence to be trained) | 20 |
| Workers (number of threads to use) | 12 |
| Sg (flag that indicates whether to use skip gram model) | 1 (to enable) |
| Iter (number of training iterations) | 15 |

The following table illustrates some example job search queries, example job title words, and the resulting cosine similarities, as calculated in accordance with some embodiments. As shown above, a high cosine similarity may be calculated for words that are similar in the given context.

| | | |
|---|---|---|
| Job Search Query | "Software" | "senior" |
| Job Title Word, | sofware, | sr, 0.714363574982 |
| Cosine Similarity | 0.730516195297 | |

| | |
|---|---|
| java, 0.649000406265 | senor, 0.628362894058 |
| c++, 0.618211507797 | snr, 0.606477618217 |
| softare, 0.609397053719 | principle, 0.596260666847 |
| sofwtare, 0.598487377167 | seniro, 0.556223750114 |

Figure 6:
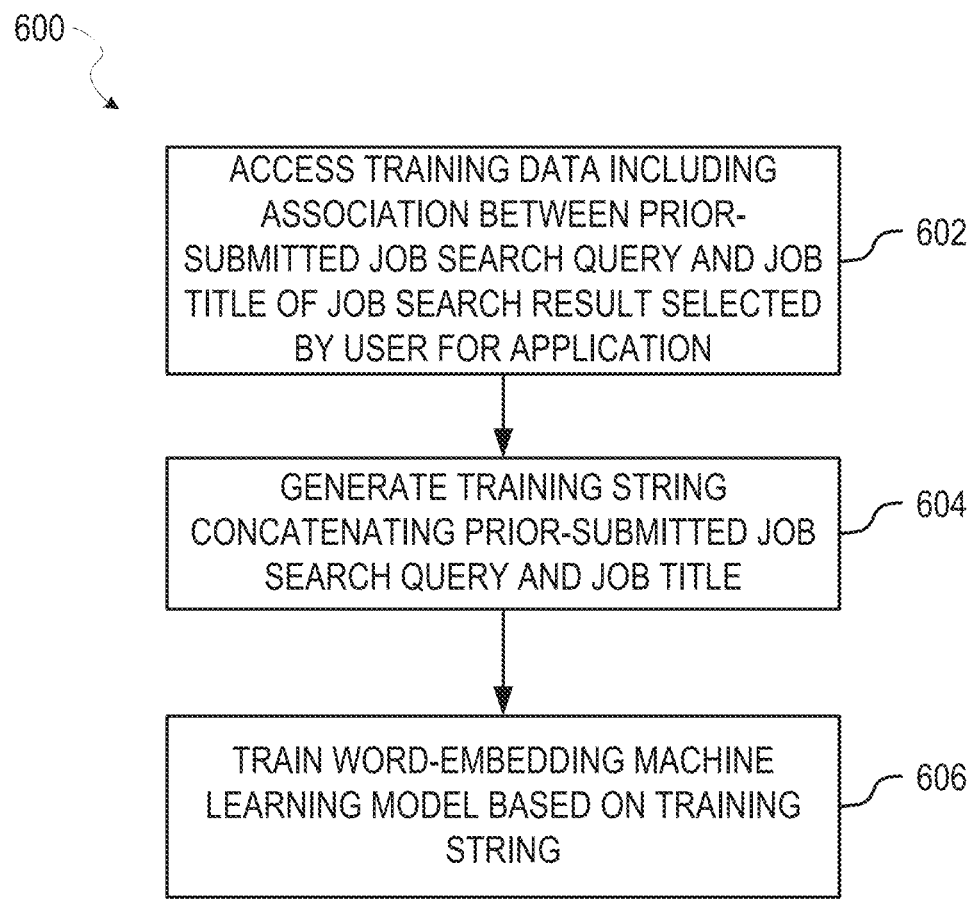
FIG. 6 is a flowchart illustrating an example method for training a word-embedding machine-learning model, according to some embodiments.

FIG. 6 is a flowchart illustrating an example method 600 for training a word-embedding machine-learning model, according to some embodiments. For some embodiments, the method 600 is performed, at least in part, by the social networking server 108 (having a hardware processor) described with respect to FIG. 1. An operation of the method 600 may be performed by a hardware processor (e.g., central processing unit or graphics processing unit) of a computing device (e.g., desktop, server, etc.).

The method 600 begins with operation 602 accessing training data including an association between a prior-submitted job search query from a user and a job title from a job search result. As described herein, the job search result may be one that resulted from executing the prior-submitted job search query and that the user selected to apply to. Additionally, the association between the prior-submitted job search query and the job title may be one based on job application data. In accordance with some embodiments, the training data comprises a plurality of pairings, where each pairing includes a job search query and a job title. The method 600 continues with operation 604 generating a training string that concatenates the prior-submitted job search query and the job title. Subsequently, the method 600 continues with operation 606 training a word-embedding machine-learning model based on the generated training string.

Figure 7:
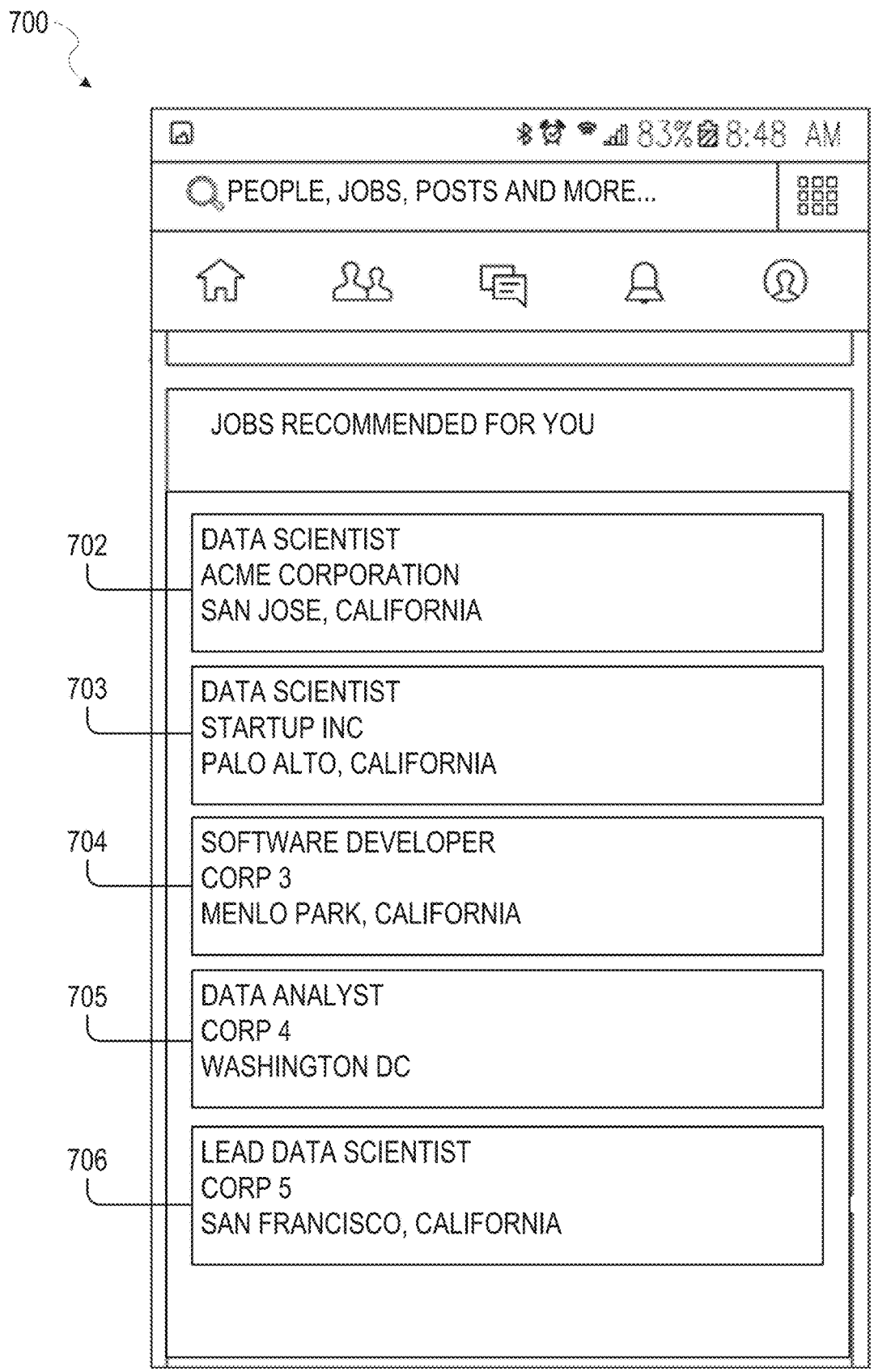
FIG. 7 is a screenshot of an example user interface that includes job search results, according to some embodiments.

FIG. 7 is a screenshot of an example user interface 700 that includes job search results 702-706, according to some embodiments. According to various embodiments, the user interface 700 is one presented by a social network (e.g., via the social networking server 108) to provide job search results, which are job postings that satisfy a job search query from the user. For various embodiments, a job search interface (not shown) is provided to a user for entering a job search query, and the resulting job matches are presented to the user in the user interface 700.

As a user scrolls down the user interface 700, more job search results are presented to the user. Various embodiments described herein determine ranking scores for job search results produced in response to a job search query from the user, and the job search results are prioritized (e.g., presented) in the user interface 700 according to the ranking scores.

Figure 8:
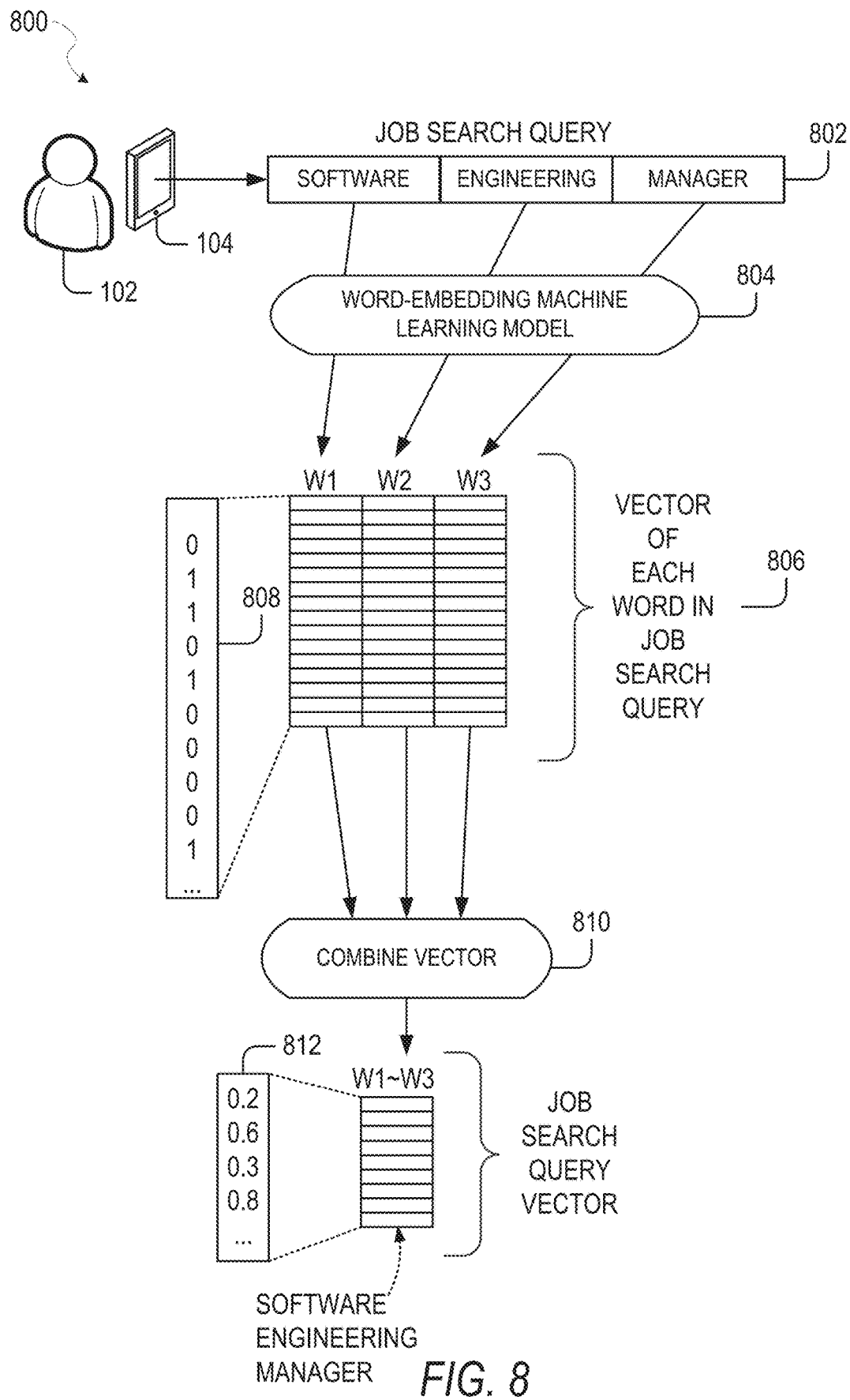
FIG. 8 is a diagram illustrating a method for generating a vector for a job search query, according to some embodiments.

FIG. 8 is a diagram illustrating a method 800 for generating a vector for a job search query, according to some embodiments. As illustrated, the user 102 enters a job search query 802 of "software engineering manager" through the client device 104. A word-embedding machine-learning model 804 (e.g., trained using the method 600) is used to map each of the words W1-W3 of the job search query 802 to a vector 806. A vector 808 represents an example of the word-to-vector mapping for the word "software." At operation 810, the vectors 806 are combined (e.g., averaged) to produce a single job search query vector 812.

Figure 9:
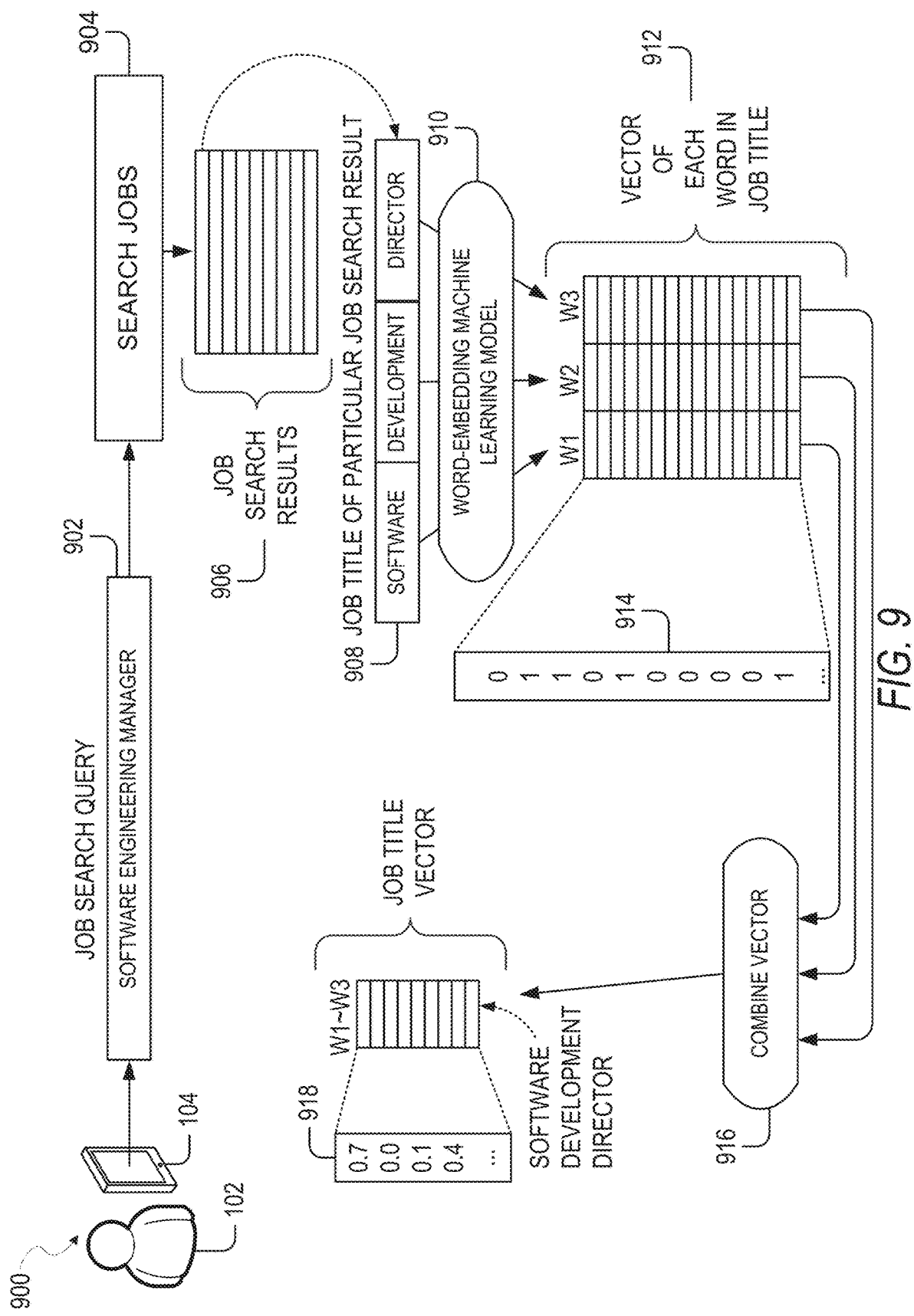
FIG. 9 is a diagram illustrating a method for generating a vector for a job title of a job search result, according to some embodiments.

FIG. 9 is a diagram illustrating a method 900 for generating a vector for a job title of a job search result, according to some embodiments. As illustrated, the user 102 enters a job search query 902 of "software engineering manager" through the client device 104. At operation 904, the job search query 902 is used to search for job postings (e.g., in the jobs database 118), and a set of job search results 906 is produced. Subsequently, each word W1-W3 in a job title 908, of one of the job search results 906, is mapped to a vector 912 using a word-embedding machine-learning model 910 (e.g., trained using the method 600). A vector 914 represents an example of the word-to-vector mapping for the word "software." At operation 916, the vectors 912 are combined (e.g., averaged) to produce a single job title vector 918.

Figure 10:
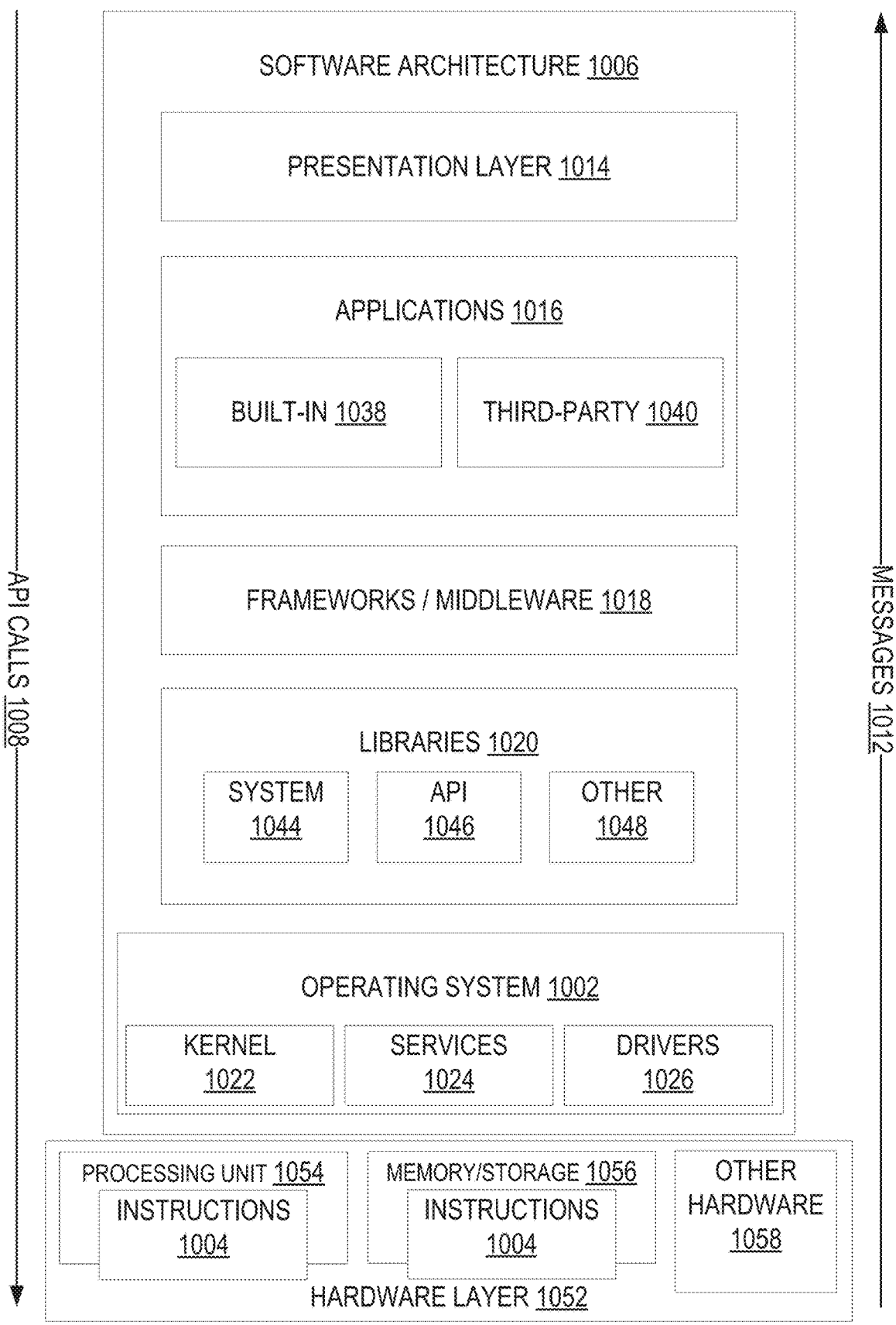
FIG. 10 is a block diagram illustrating an example software architecture, which may be used in conjunction with various hardware architectures herein described, according to various embodiments of the present disclosure.
Figure 11:
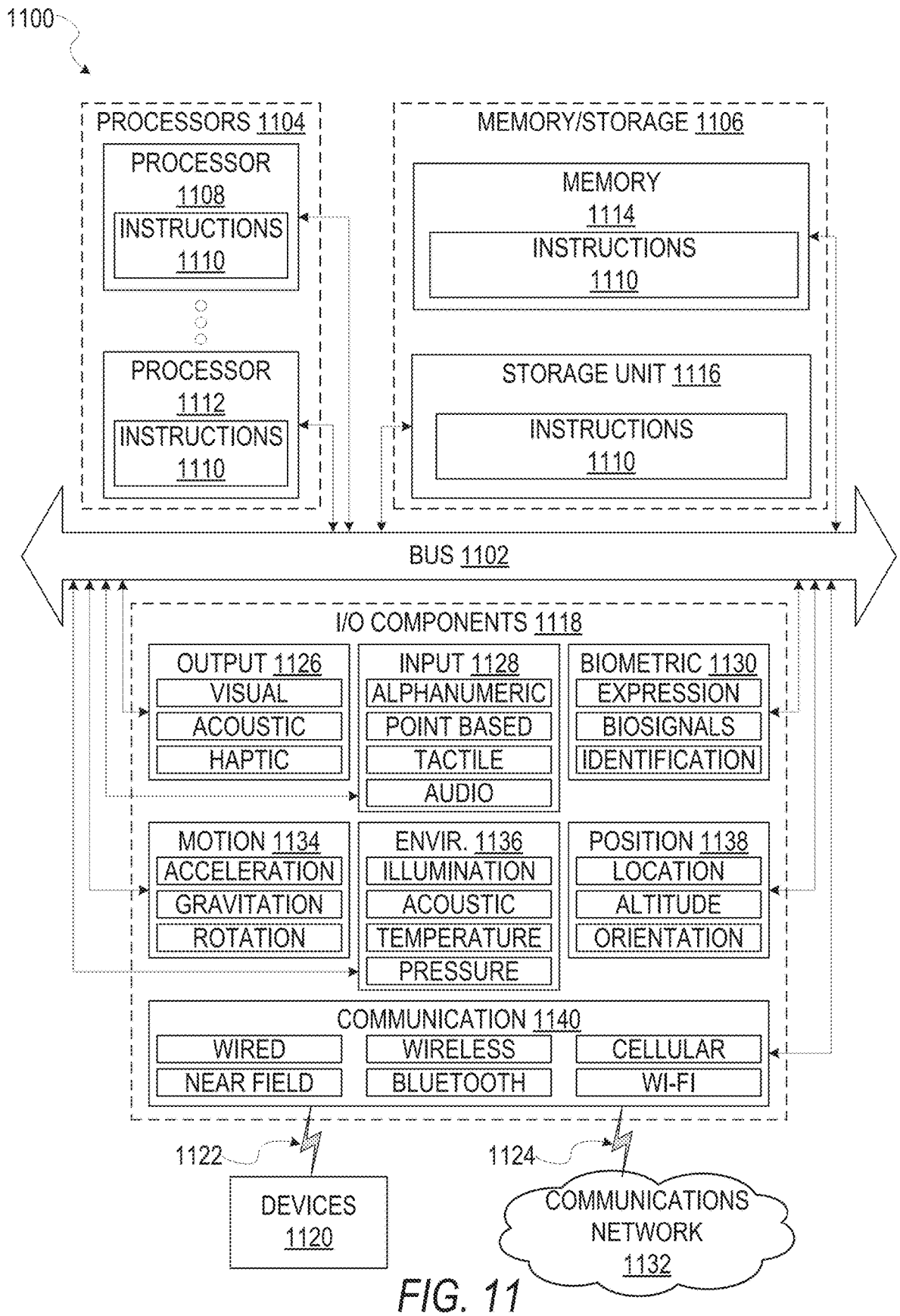
FIG. 11 is a block diagram illustrating components of an example machine able to read instructions from a machine storage medium and perform any one or more of the methodologies discussed herein, according to various embodiments of the present disclosure.

Various embodiments described herein may be implemented by way of the example software architecture illustrated by and described with respect to FIG. 10 or by way of the example machine illustrated by and described with respect to FIG. 11.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as a machine 1100 of FIG. 11 that includes, among other things, processors 1104, memory 1114, and I/O components 1118. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or memory/storage modules 1056, which also have the executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke application programming interface (API) calls 1008 through the software stack and receive messages 1012 in response to the API calls 1008. The layers illustrated are representative in nature and not all software architectures have all layers. For example, some mobile or special-purpose operating systems 1002 may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG-4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be used by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems, interactions with a user may occur through a presentation layer, such as the presentation layer 1014. In these systems, the application/component "logic" can be separated from the aspects of the application/component that interact with a user.

FIG. 11 is a block diagram illustrating components of an example machine 1100, according to some embodiments, able to read instructions 1110 from a machine storage medium and perform any one or more of the methodologies discussed herein. Specifically, Figure H shows a diagrammatic representation of the machine 1100 in the example form of a computer system, within which the instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1100 capable of executing the instructions 1110, sequentially or otherwise, that specify actions to be taken by that machine 1100. Further, while only a single machine 1100 is illustrated, the term "machine" shall also be taken to include a collection of machines 1100 that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The processors 1104 may comprise a single processor or, as shown, comprise multiple processors (e.g., processors 1108 to 1112). The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor 1108's cache memory), or any suitable combination thereof, during execution thereof by the machine 1100. Accordingly, the memory 1114, the storage unit 1116, and the memory of the processors 1104 are examples of machine storage media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various embodiments, the I/O components 1118 may include output components 1126 and input components 1128. The output components 1126 may include visual components (e.g., a display such as a plasma display panel (PDP), a lightemitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further embodiments, the I/O components 1118 may include biometric components 1130, motion components 1134, environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a communications network 1132 or devices 1120 via a coupling 1124 and a coupling 1122 respectively. For example, the communication components 1140 may include a network interface component or other suitable device to interface with the communications network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra. Code, UCC RSS-2D bar code, and other optical codes), or acoustic detection components (e.g., microphones to identify tagged audio signals). In addition, a variety of inthimation may be derived via the communication components 1140, such as location via Internet Protocol (IP) geolocation, location via Wi-Fi® signal triangulation, location via detecting an NFC beacon signal that may indicate a particular location, and so forth.

It will be understood that "various components" (e.g., modules) used in this context (e.g., system components) refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function or related functions. Components may constitute either software components (e.g., code embodied on a machine storage medium) or hardware components. A hardware component is a tangible unit capable of performing certain operations and may be configured or arranged in a certain physical manner. In various embodiments, one or more computer systems (e.g., a standalone computer system, a client computer system, or a server computer system) or one or more hardware components of a computer system (e.g., a processor 1108 or a group of processors 1104) may be configured by software (e.g., an application 1016 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor 1108 or other programmable processor 1108. Once configured by such software, hardware components become specific machines (or specific components of a machine 1100) uniquely tailored to perform the configured functions and are no longer general-purpose processors 1104. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1108 configured by software to become a special-purpose processor, the general-purpose processor 1108 may be configured as respectively different special-purpose processors (e.g., comprising different hardware components) at different times. Software accordingly configures a particular processor 1108 or processors 1104, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1104 that are temporarily configured (e.g., by software) or permanently configured to perform the relevant operations. Whether temporarily or permanently configured, such processors 1104 may constitute processor-implemented components that operate to perform one or more operations or functions described herein. As used herein, "processor-implemented component" refers to a hardware component implemented using one or more processors 1104. Similarly, the methods described herein may be at least partially processor-implemented, with a particular processor 1108 or processors 1104 being an example of hardware. For example, at least some of the operations of a method may be performed by one or more processors 1104 or processor-implemented components. Moreover, the one or more processors 1104 may also operate to support performance of the relevant operations in a "cloud computing" environment or as a "software as a service" (SaaS). For example, at least some of the operations may be performed by a group of computers (as examples of machines 1100 including processors 1104), with these operations being accessible via a communications network 1132 (e.g., the Internet) and via one or more appropriate interfaces (e.g., an API). The performance of certain of the operations may be distributed among the processors 1104, not only residing within a single machine 1100, but deployed across a number of machines 1100. In some embodiments, the processors 1104 or processor-implemented components may be located in a single geographic location (e.g., within a home environment, an office environment, or a server farm). In other embodiments, the processors 1104 or processor-implemented components may be distributed across a number of geographic locations.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long range protocols, or other data transfer technology.

"MACHINE STORAGE MFDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine storage medium" should be taken to include a single medium or multiple media (e.g., a centralized or distributed database, or associated caches and servers) able to store instructions. The term "machine storage medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine storage medium" refers to a single storage apparatus or device, as well as "cloud-based" storage systems or storage networks that include multiple storage apparatus or devices. The machine storage medium is non-transitory and, as such, excludes signals per se. A computer storage medium is an example of a machine storage medium. The term "communications medium" in this context includes modulated data signals and other carrier/communication experience elements. The term "machine-readable medium" in this context includes both a machine storage medium (e.g., a computer storage medium) and a communication medium.

"PROCESSOR" in this context refers to any circuit (e.g., hardware processor) or virtual circuit (e.g., a physical circuit emulated by logic executing on an actual processor) that manipulates data values according to control signals (e.g., "commands," "op codes," "machine code," etc.) and which produces corresponding output signals that are applied to operate a machine. A processor may, for example, be a central processing unit (CPU), a Reduced Instruction Set Computing (RISC) processor, a Complex Instruction Set Computing (CISC) processor, a graphics processing unit (GPU), a digital signal processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
    executing, by one or more processors, a job search query to generate a set of job search results;
    generating a job search query vector for the job search query based on a word-embedding machine-learning model;
    for each job search result, calculating, by the one or more processors, a similarity coefficient between the job search query and a title of the job search result based on the job search query vector, the similarity coefficient calculated based on a similarity between meaning of words in the title of the job search result and meaning of words in the job search query;
    ranking, by the one or more processors, the set of job search results based on the similarity coefficients of the job search results; and
    causing, by the one or more processors, presentation of the job results based on the ranking.

2. The method of claim 1, wherein generating the job search query vector comprises:
    generating a word vector for each word in the job search query based on the word-embedding machine-learning model; and
    combining the word vectors of the words in the job search query to generate the job search query vector.

3. The method of claim 2, wherein combining the word vectors comprises:
    calculating the job search query vector as an average of the word vectors of the words in the job search query.

4. The method of claim 1, further comprising:
    generating a job title vector for each title of the job search results based on words in each title and the word-embedding machine-learning model, wherein calculating the similarity coefficient between the job search query and a title of the job search result further comprises:
    calculating the similarity as a cosine similarity between the job search query vector and the job title vector.

5. The method of claim 4, wherein generating the job title vector for one of the job search results comprises:
    mapping each word in the title of the job search result to a word vector based on the word-embedding machine-learning model; and
    combining the word vectors of the words in the title of the job search result to generate the job title vector.

6. The method of claim 5, wherein the combining the word vectors of the words in the title of the job search result comprises:
    calculating the job title vector as an average of the word vectors.

7. The method of claim 1, wherein generating the job search query vector comprises:
    generating a raw job search query based on one or more keywords included by the job search query; and
    mapping the raw job search query to the job search queryvector based on the word embedding machine-learning model.

8. The method of claim 1, wherein the word-embedding machine-learning model is trained on a set of job search query-job search result application pairings, each pairing comprising a prior-submitted job search query and a particular job title of a job application associated with the prior-submitted job search query.

9. A method comprising:
    executing by one or more processors, a job search query to generate a set of job search results;
    for each job search result, calculating, by the one or more processors, a similarly coefficient between the job search query and a title of the job search result. the similarity coefficient calculated based on a similarity between meanin of words in the title of the job search result and meaning of words in the job search query:
    ranking, by the one or more processors, the set oflob search results based on the similarity coefficients of the job search results, wherein ranking the set of job search results comprises adjusting ranking scores of the set ofjob search results based on the similarity coefficients of the set of job search results, and
    causing, by the one or more processors, presentation of the job results based on the ranking.

10. A system comprising:
    a memory comprising instructions, and one or more computer processors, wherein the instructions, when executed by the one or more computer processors, cause the one or more computer processors to perform operations comprising:

executing, by one or more processors, a job search query to generate a set of job search results;

generating a job search query vector for the job search query based on a word- embedding machine-learning model;

for each job search result, calculating, by the one or more processors, a similarity coefficient between the job search query and a title of the job search result based on the job search query vector. the similarity coefficient calculated based on a similarity between meaning of words in the title of the job search result and meaning of words in the job search query;

ranking, by the one or more processors, the set of job search results based on the similarity coefficients of the job search results; and causing, by the one or more processors, presentation of the job results based on the ranking.

11. The system of claim 10, wherein generating the job search query vector comprises:

generating a word vector for each word in the job search query based on the word-embedding machine-learning model; and combining the word vectors of the words in the job search query to generate the job search query vector.

12. The system of claim 11, wherein combining the word vectors comprises:

calculating the job search query vector as an average of the word vectors of the words in the job search query.

13. The system of claim 10, wherein the instructions further cause the one or more computer processors to perform operations comprising:

generating a job title vector for each title of the job search results based on words in each title and the word-embedding machine-learning model, wherein calculating the similarity coefficient between the job search query and a title of the job search result further comprises:

calculating the similarity as a cosine similarity between the job search query vector and the job title vector.

14. The system of claim 13, wherein generating the job title vector for one of the job search results comprises:

mapping each word in the title of the job search result to a word vector based on the word-embedding machine-learning model; and combining the word vectors of the words in the title of the job search result to generate the job title vector.

15. The system of claim 14, wherein the combining the word vectors of the words in the title of the job search result comprises:

calculating the job title vector as an average of the word vectors.

16. The system of claim 10, wherein generating the job search query vector comprises:

generating a raw job search query based on one or more keywords included by the job search query; and mapping the raw job search query to the job search query vector based on the word-embedding machine-learning model.

17. The system of claim 10, wherein the word-embedding machine-learning model is trained on a set of job search query-job search result application pairings, each pairing comprising a prior-submitted job search query and a particular job title of a job application associated with the prior-submitted job search query.

* * * * *

UNITED STATES PATENT AND TRADEMARK OFFICE
CERTIFICATE OF CORRECTION

PATENT NO. : 10,963,457 B2  
APPLICATION NO. : 16/382518  
DATED : March 30, 2021  
INVENTOR(S) : Noh et al.

Page 1 of 1

It is certified that error appears in the above-identified patent and that said Letters Patent is hereby corrected as shown below:

In the Claims

In Column 22, Line 41, in Claim 7, delete "queryvector" and insert --query vector-- therefor In Column 22, Line 50, in Claim 9, delete "executing" and insert --executing,-- therefor In Column 22, Line 53, in Claim 9, delete "similarly" and insert --similarity-- therefor In Column 22, Line 54, in Claim 9, delete "result." and insert --result,-- therefor In Column 22, Line 56, in Claim 9, delete "meanin" and insert --meaning-- therefor In Column 22, Line 58, in Claim 9, delete "oflob" and insert --of job-- therefor In Column 22, Line 62, in Claim 9, delete "ofjob" and insert --of job-- therefor In Column 22, Line 63, in Claim 9, delete "results," and insert --result;-- therefor In Column 22, Line 67, in Claim 10, delete "instructions," and insert --instructions;-- therefor In Column 23, Line 8, in Claim 10, delete "word- embedding" and insert --word-embedding-- therefor In Column 23, Line 13, in Claim 10, delete "vector." and insert --vector,-- therefor Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*